Sept. 8, 1925.

W. H. FITCH 1,552,834

HEATING FURNACE

Filed Feb. 14, 1924

INVENTOR
WILLIAM H. FITCH.
by his attorney
George T. Engelhart

INVENTOR
WILLIAM H. FITCH.

Sept. 8, 1925.

W. H. FITCH 1,552,834

HEATING FURNACE

Filed Feb. 14, 1924   6 Sheets-Sheet 5

INVENTOR
WILLIAM H. FITCH.
by his attorney
George H. Engelhart

Sept. 8, 1925.  
W. H. FITCH  
HEATING FURNACE  
Filed Feb. 14, 1924
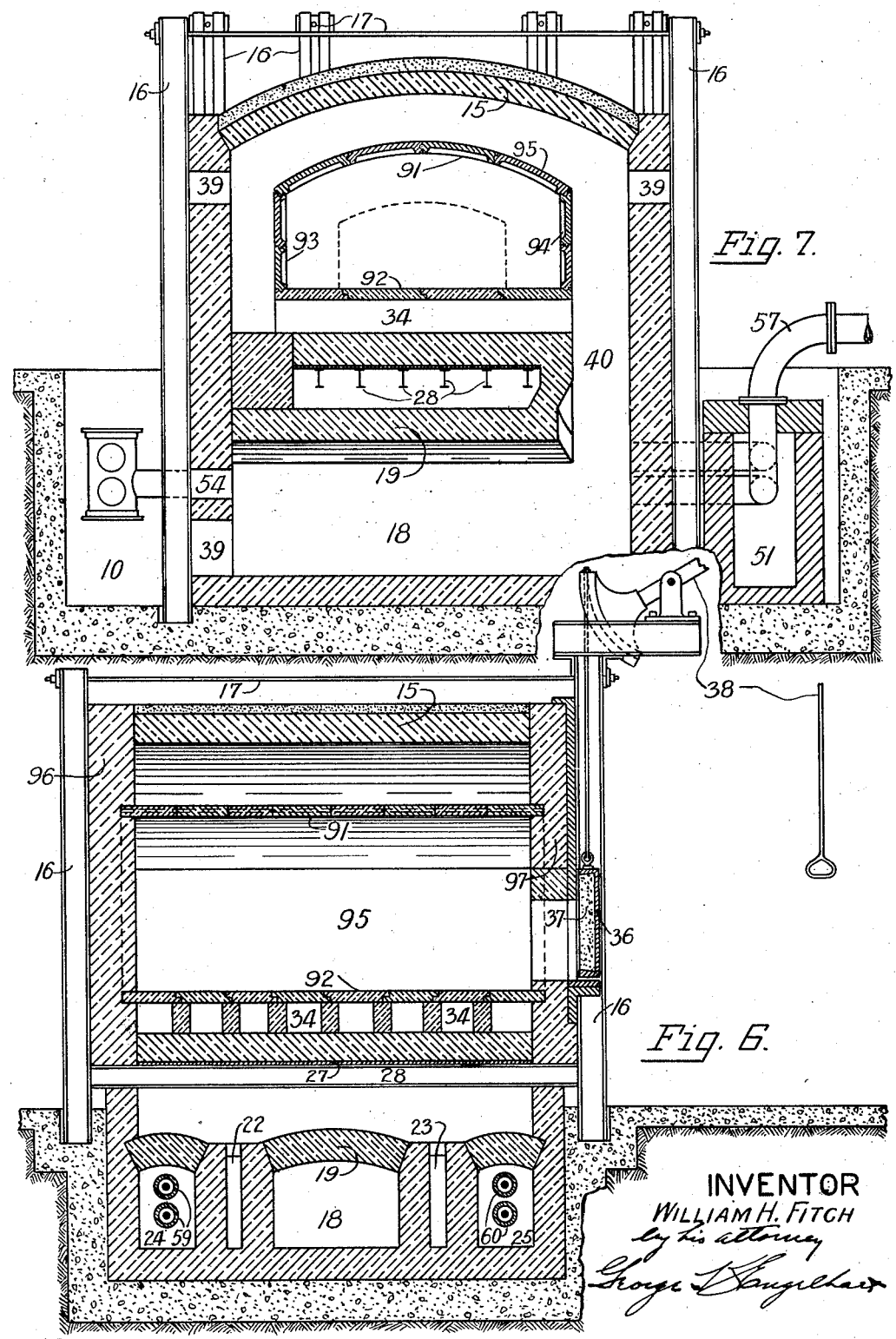

Patented Sept. 8, 1925.

1,552,834

UNITED STATES PATENT OFFICE.

WILLIAM H. FITCH, OF ALLENTOWN, PENNSYLVANIA.

HEATING FURNACE.

Application filed February 14, 1924. Serial No. 692,711.

To all whom it may concern:

Be it known that I, WILLIAM H. FITCH, a citizen of the United States, residing at Allentown, in the county of Lehigh and State of Pennsylvania, have invented certain new and useful Improvements in Heating Furnaces; and I do hereby declare the following to be a full, clear, and exact description of the invention, such as will enable others skilled in the art to which it appertains to make and use the same.

This invention relates to new and useful improvements in furnaces used in processes requiring heat treatments of materials and in which the materials to be heated are protected from direct contact with the flame and hot gases of combustion, if desired.

The present invention is an improvement and modification of the continuous heating furnace disclosed in my prior Patent No. 1,388,419, issued August 23, 1921, which relates generally to a continuous heating furnace of the under-fired type in which the hot gases of combustion pass from the combustion chamber upwardly toward the arch, over the hearth or conveyor in intimate contact with the materials to be heated, then downwardly and past the recuperator in the outlet flue and thence to the stack.

It is an object of the present invention to provide a furnace of the general nature described in my above mentioned patent, with its attendant advantages, with improvements and additions whereby it may be utilized with great advantage in arts and processes wherein it is impracticable to expose the materials to the burning gases because of oxidization, and imperfections from other sources.

It is the common present practice in the art, particularly in the steel industry, to heat the metal for normalizing in pots or boxes resting upon a hearth or upon a continuously or intermittently movable conveyor. This method is expensive and wasteful in the labor expended, in the cost of the pots or boxes, the heat lost in heating the same, and the space required to position them upon the hearth. Further, heat losses exist when the gates or doors are opened to add or remove material, in that the cold air is admitted to the entire furnace.

In the present invention, a muffle or "semi-muffle" is provided which extends throughout the length of the furnace, and completely covers the hearth and may be provided with a door or gate at either or both ends for the insertion and removal of the material to be treated. The opening of this door admits cool air only to this inner heating chamber, that is, the muffle, rather than to the entire furnace, resulting in a very substantial saving of heat and of time necessary for reheating the furnace to normal operating temperatures.

The muffle may be stacked to capacity with sheets, castings, enamel-ware or other materials to be heated, resulting in a saving of heat, space and the time required for completing the processes.

The cost of the muffle is more than offset by the cost of labor, pots, the heating of pots and the economies in fuel consumption.

The muffles may be built of materials having a high rate of heat transfer, and little sacrifice in speed of heating over the open type of hearth obtains, due to this, and further, because complete and controlled combustion is obtainable, it being unnecessary to provide the usual "smoky flame to prevent oxidization".

A further object of the invention is to provide a means for controlling the velocity and distribution or propagation of the hot gases of combustion to the end that a portion at least of the hot gases may be directed through the apertures in the "semi-muffle", into direct contact with the materials to be heated, or as an alternative the velocity may be so controlled that the gases will pass around the muffle without substantial propagation through the apertures thereof in processes wherein the material to be heated should not be subjected to direct contact with the hot gases. These ends are attained by means of dampers positioned in certain of the flues and air passage ways described in detail hereinafter.

When it is desired to obtain heat by convection, as well as by radiation, the muffle may be modified by providing a plurality of apertures in either the arch, the side walls or both arch and side walls of the muffle, thereby providing a "semi-muffle" through which heat rays and heat of convection may pass and diffuse to the heating chamber. The walls and arch are also heated to saturation, thereby combining the advantages of heat by radiation.

The problem of dust precipitation when pulverized coal is used is solved in my invention, because due to the peculiar construction of my furnace, most of the non-combustibles are deposited in the combustion chamber, the gases of combustion pass upwardly from the combustion chamber or chambers, around, over and under the muffle and hearth, completely surrounding the latter. The velocity of the gases is such that the remaining dust and ash carried thereby are not precipitated through the apertures of the "semi-muffle" to any material extent, and where the solid muffle is employed no dust will be carried into the interior of the muffle.

The use of a plurality of combustion chambers permits complete combustion control and a uniform distribution of heat throughout the muffle or heating chamber in furnaces of extended length.

In order to increase the efficiency of the fuels, the air necessary to support and control combustion is preheated by means of a recuperator placed in the outlet flue of the furnace or other suitable passage way to the atmosphere.

In the preferred form of my invention, pulverized coal is the fuel employed because of its many advantages, but it is to be understood that the furnace may be adapted in an obvious manner for firing with liquid, gaseous or solid fuels, without departing from the spirit or scope of the present invention.

Further objects and advantages, as well as the particular nature of the improvements, will be apparent from the description of certain preferred embodiments illustrated in the accompanying drawings, in which—

Fig. 6 is a longitudinal section of a modified form illustrating the muffle type furnace.

Fig. 7 is a transverse section of the form shown in Fig. 6.

In the drawings similar reference characters denote similar parts throughout the several views.

Figure 1:
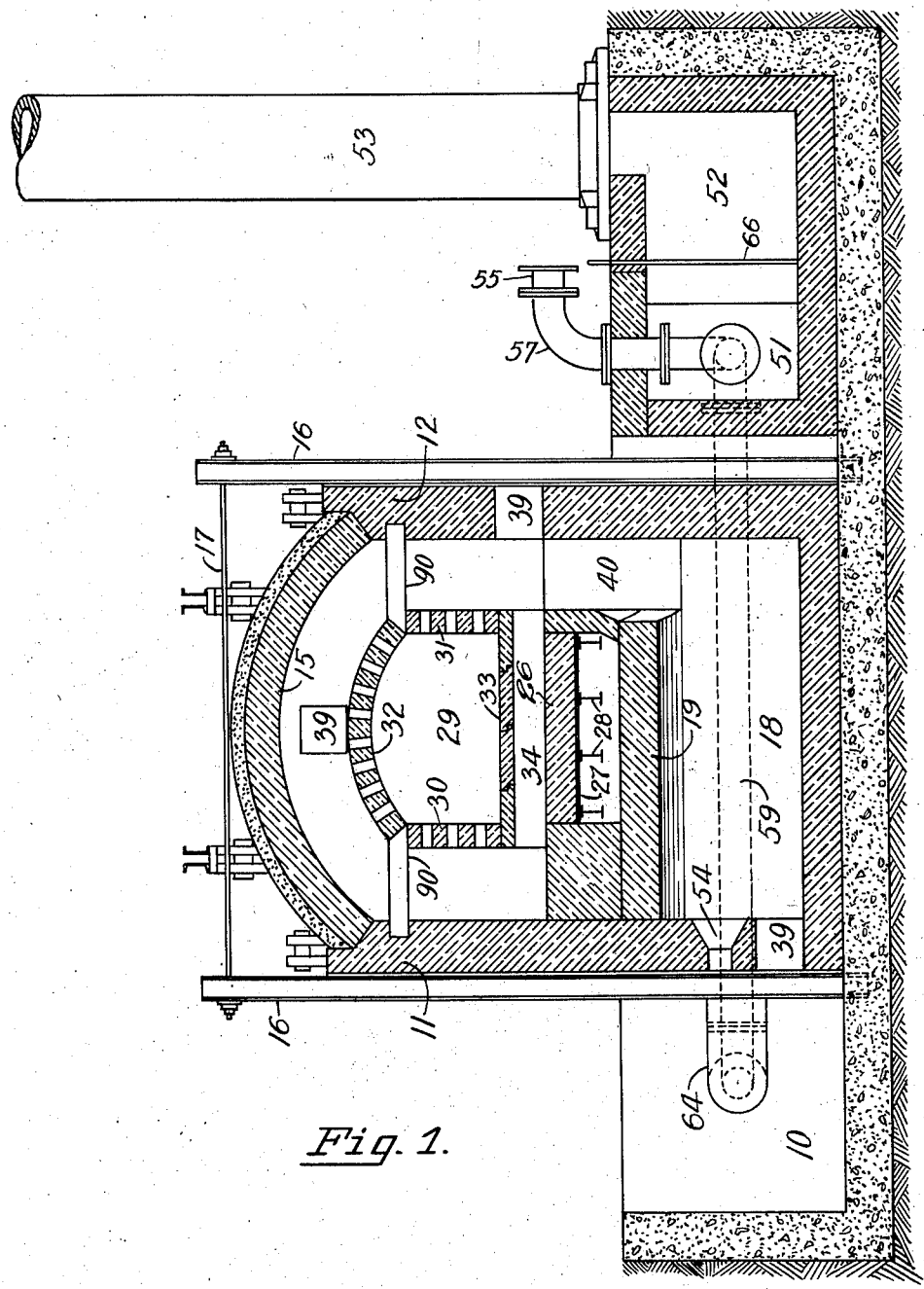
Fig. 1 is a transverse section of my furnace along the line 1—1 of Fig. 2.

The furnace is placed within a pit 10, and comprises side walls 11 and 12, end walls 13 and 14 and a top in the form of the usual arch 15. The entire furnace is braced and held together by buck staves 16 and tie rods 17.

The furnace may be provided with a hearth or one of the usual types of conveyers for supporting the materials to be heated, as illustrated in the embodiments shown, and also in my prior patent referred to previously.

Figure 2:
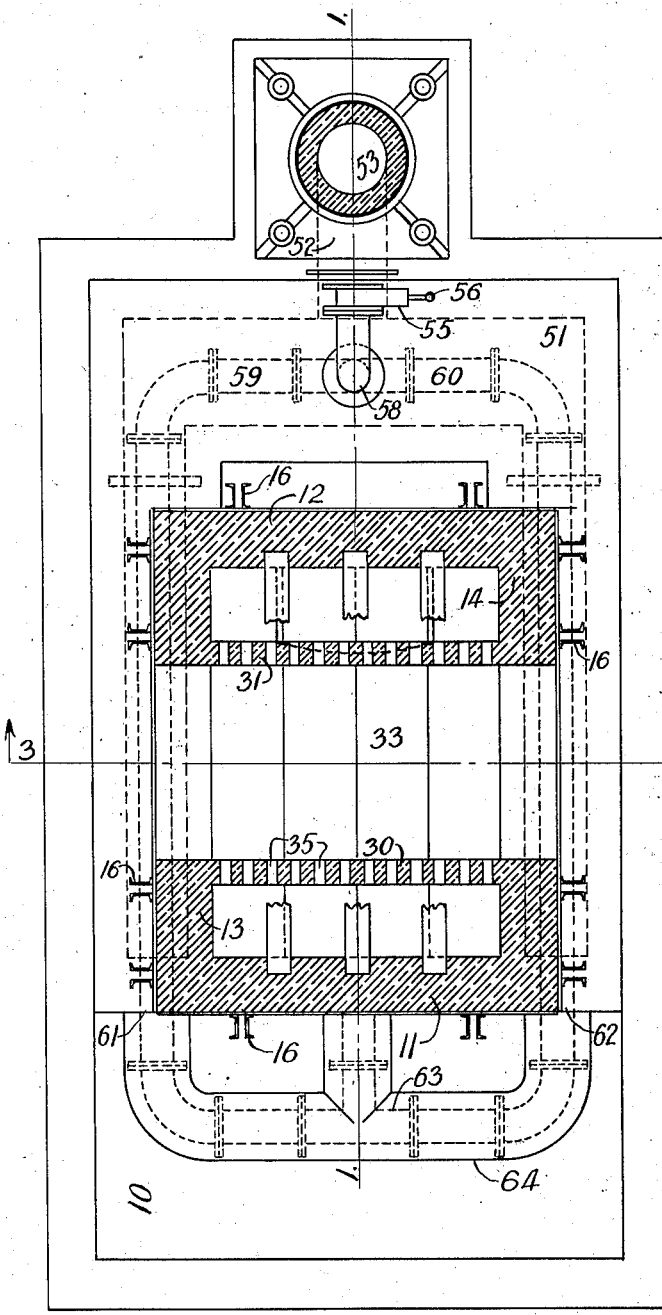
Fig. 2 is a sectional plan view of the furnace.
Figure 3:
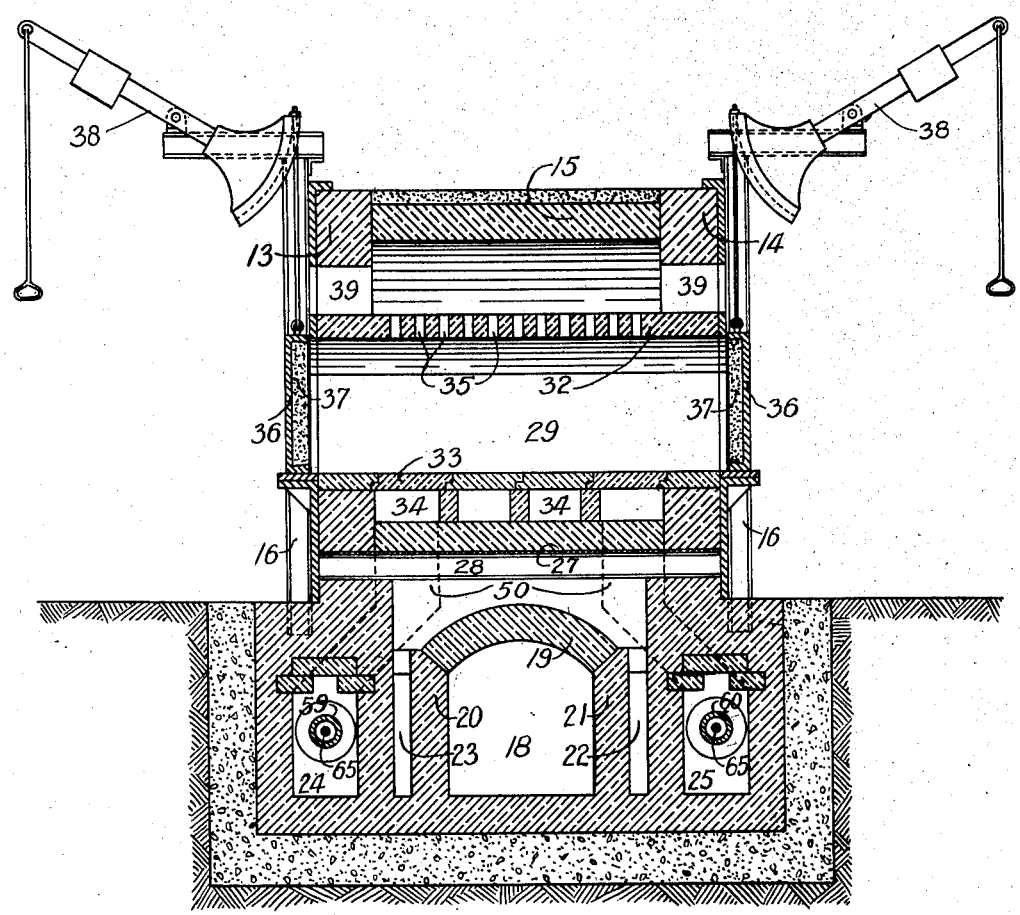
Fig. 3 is a longitudinal section along the line 3—3 of Fig. 2, in the direction of the arrows.

Referring particularly to Figs. 1, 2 and 3, a combustion chamber 18 is shown bounded by a top wall or arch 19 and side walls 20 and 21. The combustion chamber is separated by air spaces 22 and 23 from outlet flues or chambers 24 and 25 to be described hereinafter.

The hearth support 26 is supported on a plate 27 and I beams 28 extending throughout the length of the furnace and which terminate in and are supported by the end walls 13 and 14.

Supported upon the hearth support 26 and separated by air spaces from the side walls 11 and 12 and arch 15, is a muffle 29, in this form shown as a "semi-muffle," which comprises side walls 30 and 31, an arch 32, and a hearth 33.

Passageways 34—34 are provided under the hearth 33 to permit the passage of hot gases of combustion in a manner to be fully explained hereinafter.

The muffle extends throughout the length of the furnace and terminates in the end walls 13 and 14.

In certain industries it is desirable to provide for additional heating effects by convection. To this end, a plurality of apertures 35 are provided in either the side walls 30 and 31, arch 32, or both arch and walls, through which gases may be directed at the will of the operator in a manner to be explained hereinafter.

Gates 36 may be provided at either or both ends of the muffle for the insertion or removal of materials to be heated. The gates are provided with refractory material on their inner faces as shown at 37, and may be operated by any suitable means, such as shown at 38.

Clean out ports 39 closed by the usual doors, are provided at suitable locations, as shown, for the removal of precipitated non-combustibles.

Referring to Fig. 3, down-let flues 50 are shown in dotted lines leading downwardly from the upper portion of the furnace to out-let flues 24 and 25 positioned on opposite sides of and in the same horizontal plane as the combustion chamber.

These out-let flues terminate in a common flue 51, shown in dotted lines in Fig. 2 and full lines in Fig. 1, and which provides a passage way for the products of combustion from both flues 24 and 25 to a stack-flue 52 leading to the stack 53.

The fuel which may be oil, gas, pulverized coal or other suitable substance, is admitted to the combustion chamber through a burner tube 54 extending through the wall 11. It will be understood that the fuel may be supplied to the burner tube by any suitable piping or conveyer system, dependent upon the nature of the fuel, and which is not illustrated as it forms no part of the present invention.

It is necessary to supply air to the fuel as it enters the combustion chamber of the furnace, in order to control combustion and to insure that complete combustion may be attained.

The efficiency of combustion will be increased if the air is preheated before being applied to the furnace. Air may be taken from any portion of the furnace where it may be exposed to the heating effect of the products of combustion, but for reasons and objects which will appear more fully hereinafter, it is preferable to provide a recuperator system in the out-let flues 24 and 25 of the furnace.

The recuperator system is as follows: An air gate 55 provided with a suitable damper 56 is supported by the elbow 57, and may be connected to any suitable source of air pressure, not shown. The air line is directed downwardly to a T 58 in the out-let flue 51, and is there divided into two branch systems 59 and 60 which follow through the out-let flues 24 and 25 throughout the length of the flues, thence through the walls at 61 and 62 where they are again directed inwardly and are connected to a T 63 leading to the burner tube 54. The exposed portions of the system are protected from heat losses by suitable pipe coverings 64.

The recuperators proper, may be supported or suspended within the out-let flues 24 and 25 and spaced from the walls by any suitable means which will not offer a material obstruction to the flue gases.

The incoming air is thus preheated before reaching the burner by the exhaust gases from the furnace.

As shown in Fig. 3, rods or pipes 65 forming the "core-busters" are supported centrally of the recuperators by any suitable means and serve to distribute the air along the walls of the recuperators to provide uniformly preheated air at the burner. When pipes are used as "core-busters," they are sealed at each end to cause air to flow between the outside wall and the "core-buster."

The air gates 55 and damper 56 serve to control the combustion air and in some measure the velocity of the gases, but it is obvious that complete control of the velocity, distribution and propagation cannot be attained by these means alone, owing to the danger of an excess of air in the combustion chamber. To provide for complete control, a damper 66 is shown in the out-let flue to the stack and which may be operated by any suitable means.

In larger installations, such as continuous heating furnaces of high capacity, it is necessary to extend the length of the furnace, and in order to provide for an even distribution of heat throughout the length of the muffle, it is advisable to provide a plurality of combustion chambers. The number of combustion chambers is obviously dependent on the length of the furnace employed and the temperature required.

Figure 4:
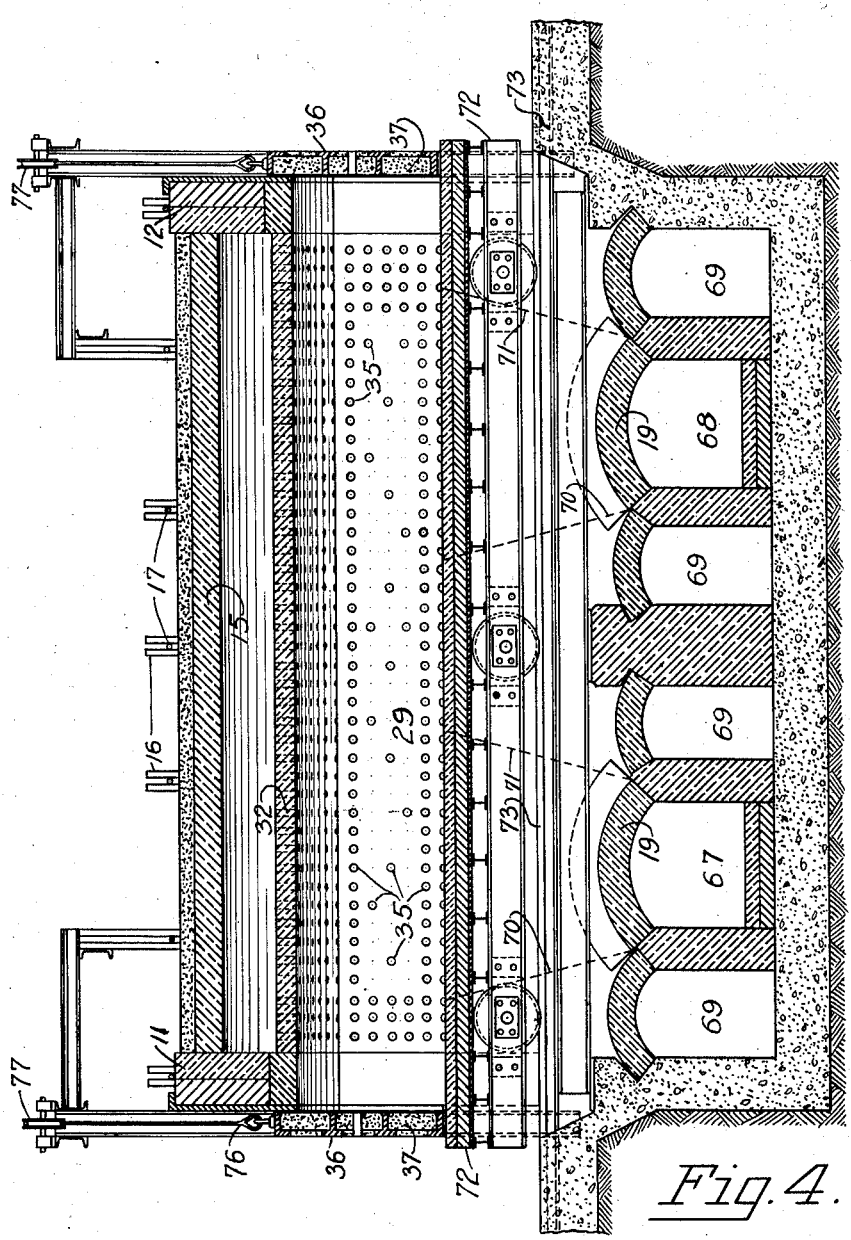
Fig. 4 is a longitudinal section of a slightly modified form of the furnace along the line 4—4 of Fig. 5, in which a plurality of combustion chambers and a conveyer of the car type are employed.
Figure 5:
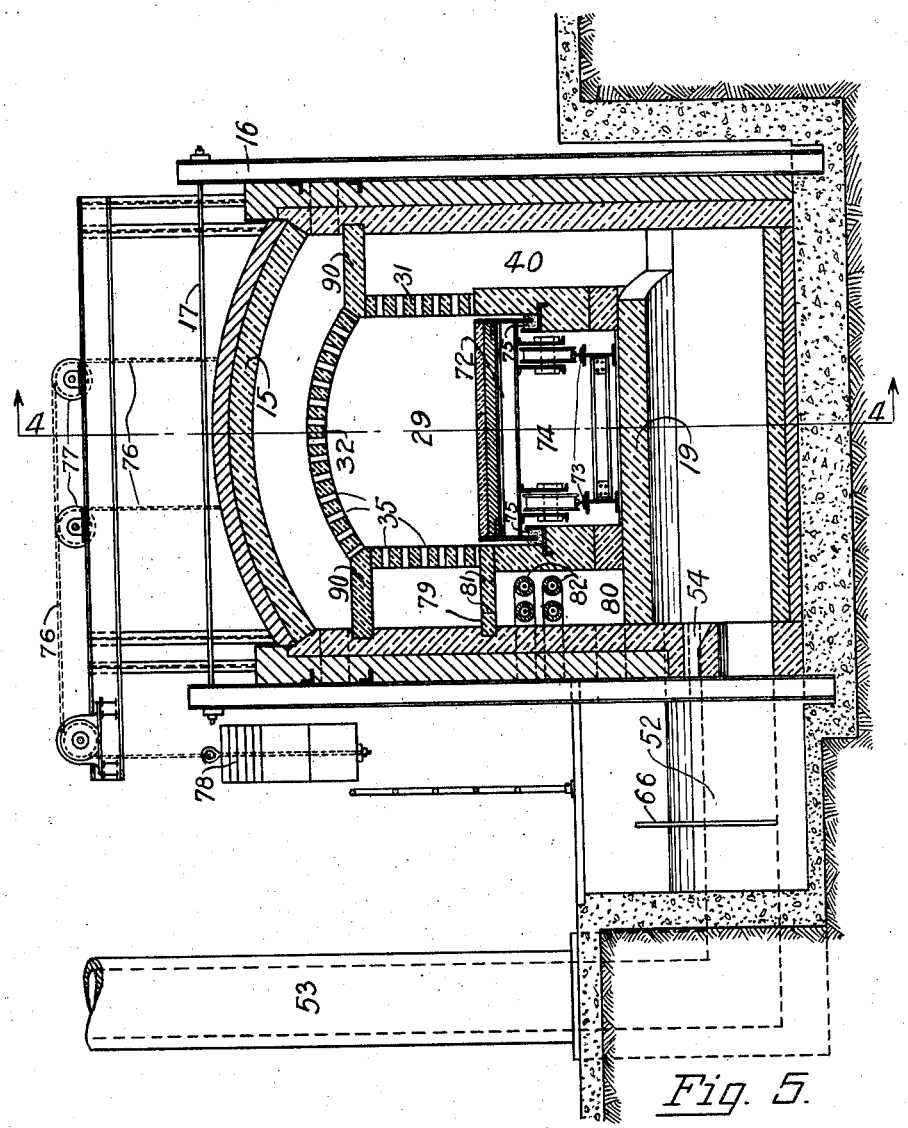
Fig. 5 is a transverse section of the form shown in Fig. 4.

Figs. 4 and 5 illustrate the use of a plurality of combustion chambers in a single car type of underfired annealing furnace. Two combustion chambers 67 and 68 are shown by way of illustration, but it is to be understood, that additional combustion chambers may be provided when the size of the furnace warrants their use. Air spaces are provided at 69—69 to permit cooling of the refractory walls.

Leading upwardly into the furnace are flues 40 provided with upwardly diverging side walls as shown in the dotted lines 70 and 71 in Fig. 4, to permit transverse expansion of the envelope of flame and hot gases and to provide for an even distribution of heat throughout the length of the muffle.

While it may also be understood that any suitable hearth or conveyor for the materials to be heated may be employed, a single car 72 is shown and which travels on rails 73 in a lower chamber 74 of the muffle 29.

A sand-seal 75 is shown at each side of the car to prevent the admission of hot gases to the lower chamber 74, to protect the running gear of the conveyer.

Suitable gates 36, provided with refractory inserts 37 on their inner faces, close the ends of the muffle and are suspended from chains 76 passing over sheaves 77—77 and are balanced by a suitable counterweight 78.

In this furnace, a slightly modified form of recuperator system is employed. An apertured floor 79 encloses a space 80 forming the out-let flue of the furnace. Apertures are indicated by dotted lines 81 and are of relatively much less width than the width of the flues 70—71, in order that the hot gases may be materially retarded to provide thereby for an even distribution and to prevent loss of heat.

A recuperator is shown at 82 and comprises a system of four tubes provided with

"core-busters", and is supported directly in the path of the downwardly projected gases and parallel to the path of the waste gases in the out-let flue 80.

A damper for controlling the velocity and distribution of the gases is shown at 66 in the out-let flue 52 to the stack 53.

The members 90 merely serve as braces for the muffle and are of such narrow cross-section that they do not offer a material obstruction to the passage of the hot gases.

One of the burners is indicated at 54 in Fig. 5.

The modification shown in Figs. 6 and 7 is essentially similar to that shown in Figs. 1, 2 and 3 with this difference; a self-supporting solid wall muffle is shown at 91, consisting of the hearth 92, side walls 93 and 94 and arch 95, each of which terminates in the end walls 96 and 97.

Beneath the hearth are a plurality of gas passage ways 34, to provide for further heating of the hearth.

A combustion chamber is shown at 18 and is separated from outlet flues 24—25 by air spaces 22 and 23.

A recuperator 59—60 is shown in each out-let flue 24 and 25.

The operation of the furnace is generally as follows:

Fuel and air are admitted in suitable quantities to the combustion chamber 18, the amount of air being regulated by the air gate 55. Owing to the peculiar arrangement of the parts of my furnace, it is unnecessary to provide the usual smoky flame to protect the materials from oxidation, and complete and controlled combustion may be maintained without danger.

The size of the combustion chamber, and its position beneath the heating chamber provide for substantially complete combustion of the fuel before the gases and flame enter the heating chamber. For this reason, nearly all solid or molten non-combustibles present in the fuel when pulverized coal is used, are precipitated in the combustion chamber from which they may be removed at convenient intervals through the clean-out ports.

The envelope of flame and hot gases, as it passes upwardly through the flues, expands transversely therein and in the air space separating the furnace wall and muffle.

The hot gases diffuse and pass completely over the muffle, and thence downwardly toward the out-let flue. The relatively small apertures in the top of the out-let chamber decrease the velocity of the gases and permit a more even distribution of heat.

In the furnace shown in Figs. 1, 2, 3, 6 and 7, the gas passage ways 34 provide for additional heating of the hearth. It has been observed in the operation of this furnace, that the relatively high velocity of the gases entering the heating chamber, creates a suction which draws a portion of the hot gases which have passed over the muffle, back through the passage ways toward the flues 40, 70—71.

The waste gases from the heating chamber, passing through the out-let flue are distributed along the recuperator 59—60, thereby preheating the entering combustion air and providing for more efficient combustion.

In some industries it is desirable to provide for heating by convection as well as by radiation, to this end, the apertured or "semi-muffle" is desirable as the hot gases may be directed through the apertures in the muffle by varying the velocity of the gases by means of the damper 66 in the out-let flue to the stack. The velocity of the gas is such, however, that most of the small amount of dust and ash carried into the heating chamber is drawn entirely over the muffle. That which may be precipitated in the heating chamber may be removed through the clean-out ports.

When a plurality of combustion chambers is employed, the same advantages are obtainable, with the addition that a more uniform distribution of heat is obtainable throughout the length of the muffle, when the latter is of extended length.

I desire to call attention to the relative arrangement of parts of the furnace. The combustion chamber is directly under the heating chamber, the combustion of the fuel is completed in this chamber, and solid and molten non-combustibles precipitated, the clean flame then passes into the heating chamber and completely surrounds the muffle before passing to the out-let flue containing the recuperator.

In certain of the modifications a portion of the gases pass under the hearth and provide additional heating effects. The damper in the stack flue permits control of heat distribution.

While certain preferred embodiments have been shown and described, it will be understood that various changes in the number of combustion chambers may be made, that solid or "semi-muffles" may be substituted in any of the forms shown, and that various changes in the details of construction in the proportioning of parts of the furnace and the recuperative device may be made without departing from the principles of the invention as defined in the appended claims.

I claim:

1. In an underfired furnace, the combination of a heating chamber, a combustion chamber situated below the heating chamber, a flue leading from the combustion chamber to the heating chamber, a muffle supported within the heating chamber, and provided with side walls and an arch spaced from the side walls and arch of the heating chamber, a downlet flue on the opposite side of the heating chamber, and a recuperator situated in the down-let flue in the path of gases passing through said flue.

2. In an underfired furnace, the combination of a heating chamber, a combustion chamber positioned beneath said heating chamber, a muffle supported in said heating chamber, said muffle having a hearth, side walls and an arch which terminate in the end walls of the heating chamber, the side walls and arch of said muffle being separated from the side walls and arch of the heating chamber by a space forming a gas passage, a flue connecting the combustion chamber and the heating chamber, a down-let flue on the opposite side of the muffle, said air spaces and flues providing a continuous passage for hot gases leading from the combustion chamber, around the muffle and through the out-let flue.

3. In a furnace, the combination of a heating chamber, a combustion chamber positioned beneath said heating chamber, a flue leading from said combustion chamber to the heating chamber, a hearth support in said heating chamber, a muffle supported on said hearth support, said muffle being provided with a plurality of apertures for the admission of gases into the muffle, a plurality of down-let flues leading from the heating chamber and terminating in a plurality of out-let flues, recuperators in said out-let flues for supplying preheated air to the combustion chamber.

4. In a furnace, the combination of a combustion chamber, means for admitting a mixture of fuel and air to the combustion chamber, a heating chamber positioned above the combustion chamber, a hearth-support in said heating chamber, a muffle positioned in said heating chamber, said muffle being provided with a plurality of apertures for the admission of hot gases, a gas passage way between the muffle and the hearth-support, a flue leading from the combustion chamber to the heating chamber, an out-let flue and means in said out-let flue to control the velocity of the gases.

5. In a furnace, the combination of a heating chamber, means in said chamber for supporting a muffle, a muffle supported on said means having side walls and an arch terminating in the end walls of the heating chamber and spaced from the side walls and arch, a combustion chamber below said heating chamber, a flue having upwardly diverging side walls connecting said combustion chamber to said heating chamber, said flue providing a means whereby the envelope of hot gases and flame will expand transversely and be uniformly distributed over the muffle.

6. In an underfired muffle furnace, a heating chamber, a muffle in said chamber spaced from the side walls of the heating chamber, a gate at the end of the muffle for the admission or removal of material to be heated, a combustion chamber below the heating chamber, a flue having upwardly diverging side walls leading from the combustion chamber to the heating chamber, and means providing a passage-way to the atmosphere for the waste gases of combustion.

7. In an underfired muffle furnace, the combination of a heating chamber, a muffle in said heating chamber, the side walls and arch of which terminate in the end walls of the heating chamber and are spaced from the side walls and arch thereof, a plurality of combustion chambers positioned beneath said heating chamber, upwardly diverging flues leading from the combustion chamber to the heating chamber, whereby the hot gases of combustion may be uniformly distributed throughout the length of the muffle.

8. In a furnace, the combination of a heating chamber, a muffle supported in said heating chamber, a plurality of combustion chambers positioned below said heating chamber and separated from each other by air spaces, a plurality of flues leading from the combustion chamber to the heating chamber, an out-let flue provided with apertures of lesser width than the first mentioned flues for the admission of gases from the heating chamber to said out-let flue, a stack flue, and a stack for receiving the gases from the out-let flue and discharging the same to the atmosphere.

9. In a furnace, the combination with a heating chamber, means in said chamber for supporting a muffle, said muffle being spaced from the side walls and arch of the heating chamber and terminating in the end walls, the arch of the muffle being provided with a plurality of apertures for the admission of hot gases, gates at both ends of the muffle for admitting and removing material, a plurality of combustion chambers beneath the heating chamber, flues leading from the combustion chambers to the heating chamber, an out-let flue having apertures therein for admitting waste gases from the heating chamber, a recuperator system in said out-let flue in the path of the waste gases, means for admitting air to said recuperator system, a burner in each combustion chamber, and means for admitting fuel and air to the burners, the air being preheated in the recuperator system.

In testimony whereof I affix my signature.

WILLIAM H. FITCH